(12) United States Patent
Thurber

(10) Patent No.: US 6,377,663 B1
(45) Date of Patent: *Apr. 23, 2002

(54) CALL MANAGEMENT SYSTEM AND ASSOCIATED METHOD FOR A LOCAL TELEPHONE CIRCUIT

(75) Inventor: Donald W. Thurber, Easley, SC (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/778,640

(22) Filed: Jan. 3, 1997

(51) Int. Cl.[7] .......................... H04M 1/64; H04M 3/42; H04M 1/24

(52) U.S. Cl. ................ 379/88.03; 379/67.1; 379/88.02; 379/207.11; 379/201.01; 379/31; 379/87

(58) Field of Search .............................. 379/67, 88, 89, 379/67.1, 88.01, 70, 10, 34, 100.05, 102.05, 58, 68, 80, 88.02, 88.03, 88.04, 88.17, 88.19, 142.01, 201.01, 201.11, 207.11, 207.13, 22.02, 23, 27.02, 31, 32.04, 87, 418, 421

(56) References Cited

U.S. PATENT DOCUMENTS

| | | | |
|---|---|---|---|
| 4,757,425 A | * 7/1988 | Matthews et al. | 379/89 |
| 4,870,686 A | * 9/1989 | Gerson et al. | 381/43 |
| 5,007,081 A | * 4/1991 | Schmuckal et al. | 379/354 |
| 5,125,024 A | * 6/1992 | Gokcen et al. | 379/88 |
| 5,297,183 A | 3/1994 | Bareis et al. | 379/59 |
| 5,317,626 A | 5/1994 | Jaynes et al. | 379/67 |
| 5,317,629 A | 5/1994 | Watanabe | 379/93 |
| 5,325,421 A | 6/1994 | Hou et al. | 379/67 |
| 5,353,336 A | 10/1994 | Hou et al. | 379/67 |
| 5,369,685 A | 11/1994 | Kero | 379/67 |
| 5,394,445 A | * 2/1995 | Ball et al. | 379/67.1 |
| 5,479,490 A | * 12/1995 | Nakashima | 379/74 |
| 5,481,594 A | * 1/1996 | Shen et al. | 379/67.1 |
| 5,483,579 A | * 1/1996 | Stogel | 379/88 |
| 5,604,791 A | * 2/1997 | Lee | 379/67.1 |
| 5,631,745 A | * 5/1997 | Wong et al. | 358/434 |

* cited by examiner

Primary Examiner—Allan Hoosain
(74) Attorney, Agent, or Firm—Maginot, Addison & Moore

(57) ABSTRACT

A call management system includes a local telephone circuit, a first telephone set, a second telephone set, and a telephony device. The first telephone set, the second telephone set, and the telephony device, each coupled to the local telephone circuit. The telephony device includes an off-hook monitor that detects an off-hook state on the local telephone circuit, and a command processor which recognizes a voice command signal transmitted from either the first telephone set or the second telephone set. A method for telephone call management is also disclosed.

14 Claims, 3 Drawing Sheets

CALL MANAGEMENT SYSTEM AND ASSOCIATED METHOD FOR A LOCAL TELEPHONE CIRCUIT

BACKGROUND OF THE INVENTION

The present invention relates to a telephone call management system and method, and more particularly to a telephony device and method for call management of a local telephone circuit.

In developing capabilities for computer telephony integration (CTI), many telephone call management systems have been created in which computer software assists a caller in accomplishing the desired call management action. Such call management actions include, but are not limited to, placing telephone calls by entering a name or telephone number, answering telephone calls, placing telephone calls on hold, or conferencing in an additional party. Such call management requests are typically made by users of the call management system through various means, including keyboard and mouse. These prior art solutions typically require the user to be located at, or in close proximity to the computer acting as a telephony device, where the user has ready access to conventional input/output mechanisms.

It is desirable to also provide call management capabilities of a telephony device to a user who is not located at the computer, as this can be a considerable inconvenience when compared to the existing standard where telephone extensions may be located throughout a house or business. In addressing this desired functionality, it is proposed that remote telephone extensions be used as an input/output device to allow the user to provide call management requests to the telephony device from any telephone set that is physically connected to the same local telephone circuit as the telephony device.

While computer-based call management has been a recognized endeavor in the industry, prior products have included one or more of the following constraints: direct, local interaction with the computer (not through a telephone); a requirement that contact between the computer and a telephone user be initiated by a dialed telephone call, and that the call management be executed on a special-function computer system such as a private branch exchange (PBX), for which the sole application is telephone switching and management.

What is needed therefore is a method and apparatus which provides call management capabilities to all telephone sets connected to a local telephone circuit and which is inexpensive enough to be used in a home environment.

SUMMARY OF THE INVENTION

In accordance with one embodiment of the present invention, there is provided a method for telephone call management. The method includes the steps of detecting an off-hook state of a telephone circuit that carries a the telephone signal; reducing a dial tone signal of the telephone signal; receiving the telephone signal including a command signal from a telephone set coupled to the telephone circuit; determining a call management action that corresponds with the command signal; and executing the call management action.

In accordance with another embodiment of the present invention, there is provided a telephony device. The telephony device includes an off-hook monitor, an execution means for executing a call management action, a signal reducer, and a command processor. The off-hook monitor, the execution means, and the signal reducer are each operatively coupled to a local telephone circuit via a telephone interface. The command processor is operatively coupled to the off-hook monitor and the signal reducer. The off-hook monitor is configured to detect whether the local telephone circuit is in an off-hook state. The signal reducer is configured to receive a telephone signal having a dial tone signal and to transmit a dial tone reduced telephone signal when the local telephone circuit is in the off-hook state. The command processor is configured to receive the dial tone reduced telephone signal that includes a command signal from a telephone set coupled to the local telephone circuit, to determine a call management action that corresponds with the command signal, and to send a number of control signals to said execution means to effectuate the call management action.

In accordance with yet another embodiment of the present invention there is provided a call management system. The call management system includes a local telephone circuit, a first telephone set, a second telephone set, and a telephony device. The first telephone set, the second telephone set, and the telephony device are each coupled to the local telephone circuit. The telephony device includes an off-hook monitor that detects an off-hook state on the local telephone circuit, and a command processor which recognizes a voice command signal transmitted from an input telephone set that is selected from the first telephone set and the second telephone set.

It is an object of the present invention to provide a new and useful method for telephone call management.

It is another object of the present invention to provide an improved method for telephone call management.

It is a further object of the present invention to provide a method for telephone call management that is inexpensive enough to be implemented in a home.

It is yet another object of the present invention to provide a method for telephone call management that supports voice commands.

It is yet a further object of the present invention to provide a method for telephone call management that may be implemented in a general purpose computer.

It is an object of the present invention to provide a new and useful telephony device.

It is yet another object of the present invention to provide a telephony device that may be used from any telephone connected to the same local telephone circuit as the telephony device.

It is an object of the present invention to provide a new and useful call management system.

It is another object of the present invention to provide an improved call management system that supports voice commands.

The above and other objects, features, and advantages of the present invention will become apparent from the following description and the attached drawings.

DETAILED DESCRIPTION OF THE PREFERRED EMBODIMENTS

Figure 1:
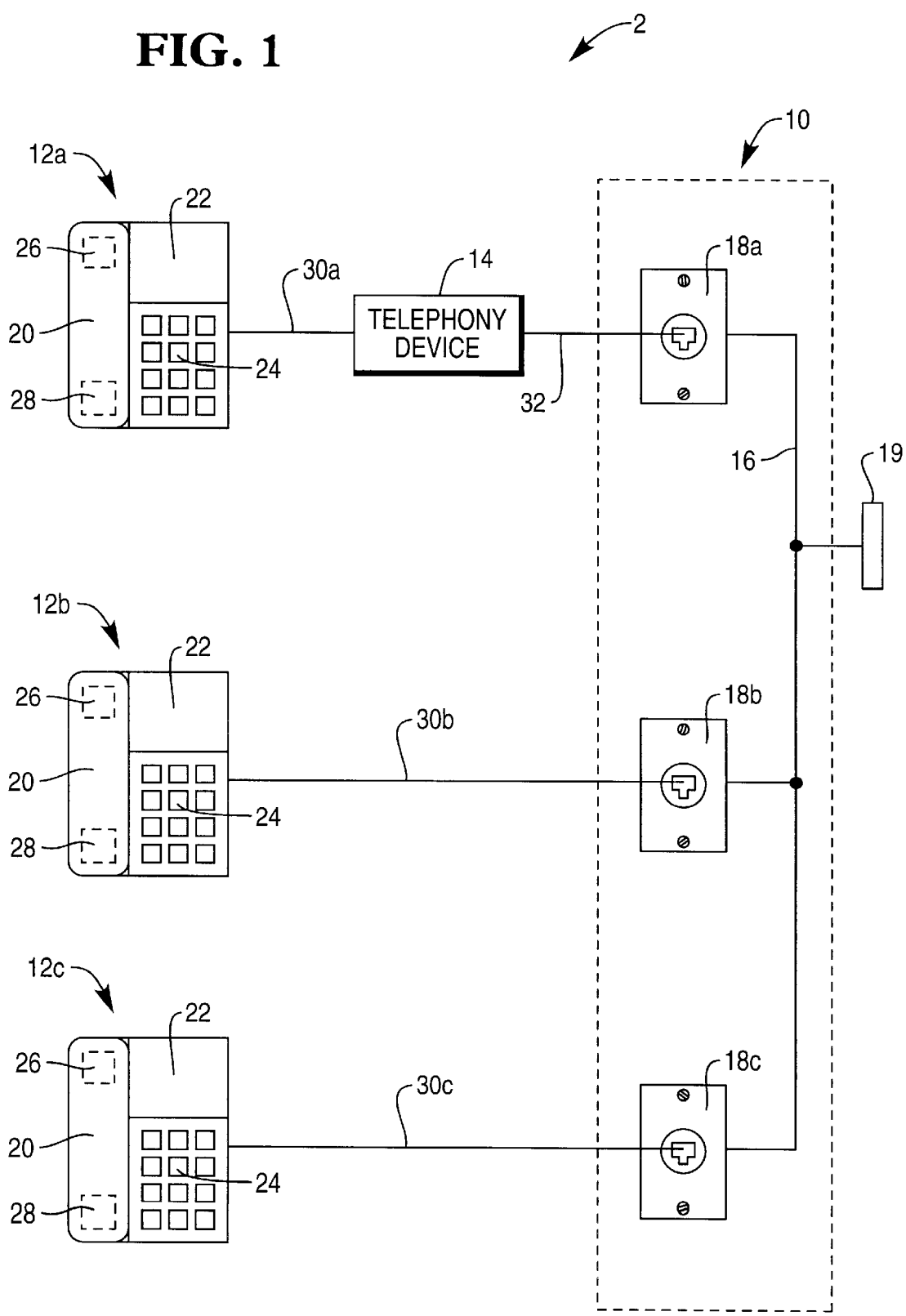
FIG. 1 is a block diagram of an exemplary embodiment of a call management system which incorporates features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Now referring to FIG. 1, there is shown a call management system 2 which incorporates the features of the present invention therein. The call management system 2 includes a conventional telephone circuit 10, a plurality of conventional telephone sets 12a–12c, and a telephony device 14. The local telephone circuit 10 includes telephone wiring 16, and a plurality of telephone jacks 18a–18c. The telephone wiring 16 operatively couples the telephone jacks 18a–18c to each other and to a branch exchange 19 that includes known telephone switching equipment. It should be appreciated that the branch exchange 19 may be implemented as either a central branch exchange (CBX) or a private branch exchange (PBX).

The telephone sets 12a–12c may each include a handset 20, and a base unit 22 having a key pad 24 for transmitting dual tone modulated frequency (DTMF) signals. The handset 20 includes a receiver 26 and a transmitter 28. The receiver 26 receives audio information (e.g. a dial tone, computer generated speech, human speech) in a known manner, and the transmitter 28 transmits audio information (e.g. human speech) in a known manner. It should be appreciated that in implementations of the present invention that provide for a wide array of voice activated call management actions the telephone sets 12a–12c may not need to include a key pad 24. In these implementations, all call management actions may be initiated via voice command signals sent via the transmitter 28.

In one embodiment of the present invention, the telephone sets 12b and 12c are operatively coupled to the branch exchange 19 via the telephone jacks 18b and 18c and the individual telephone cords 30b and 30c, respectively. The telephone set 12a is operatively coupled to the branch exchange 19 via the telephony device 14, the telephone cord 30a, and the telephone jack 18a. In the preferred embodiment, the telephone set 12a is coupled to the branch exchange 19 via the telephony device 14 in such a manner that when telephony device 14 is turned off, telephone set 12a is still operable. That is, a user may still receive and place telephone calls through telephone set 12a even if telephony device 14 is turned off.

It should be appreciated that the above coupling of telephone sets 18a–18c to the branch exchange 19 is only one possible implementation. For example, any of the telephone sets 12a–12c may be coupled to the telephony device 14, coupled to the telephone jacks 18a–18c, or hard-wired to the branch exchange 19. However, due to the fact that most homes are already wired with several telephone jacks, the above implementation is preferred because it does not require any additional wiring. Furthermore, having at least one telephone set 12a–12c operatively coupled to the branch exchange 19 via the telephony device 14 provides the call management system 2 with the additional advantage of being able to isolate the telephone set from the telephone circuit 10 for special uses, such as recording or playing back messages, without interference of or tying up of the branch exchange 19.

As a result of the above coupling of the telephone sets 12a–12c, a user may place an outgoing call through the branch exchange 19 by using any of the telephones 12a–12c. Likewise, a user may receive an incoming telephone call through the branch exchange 19 by picking up any of the telephones 12a–12c. Furthermore, audio information may be transmitted from one off-hook telephone set 12a–12c to another off-hook telephone set 12a–12c without dialing a telephone number. However, a dial tone signal, which the branch exchange 19 injects on the local telephone circuit 10 whenever a telephone set 12a–12c is in an off-hook state, interferes with audio information transmitted from the off-hook telephone sets 12a–12c.

Figure 2:
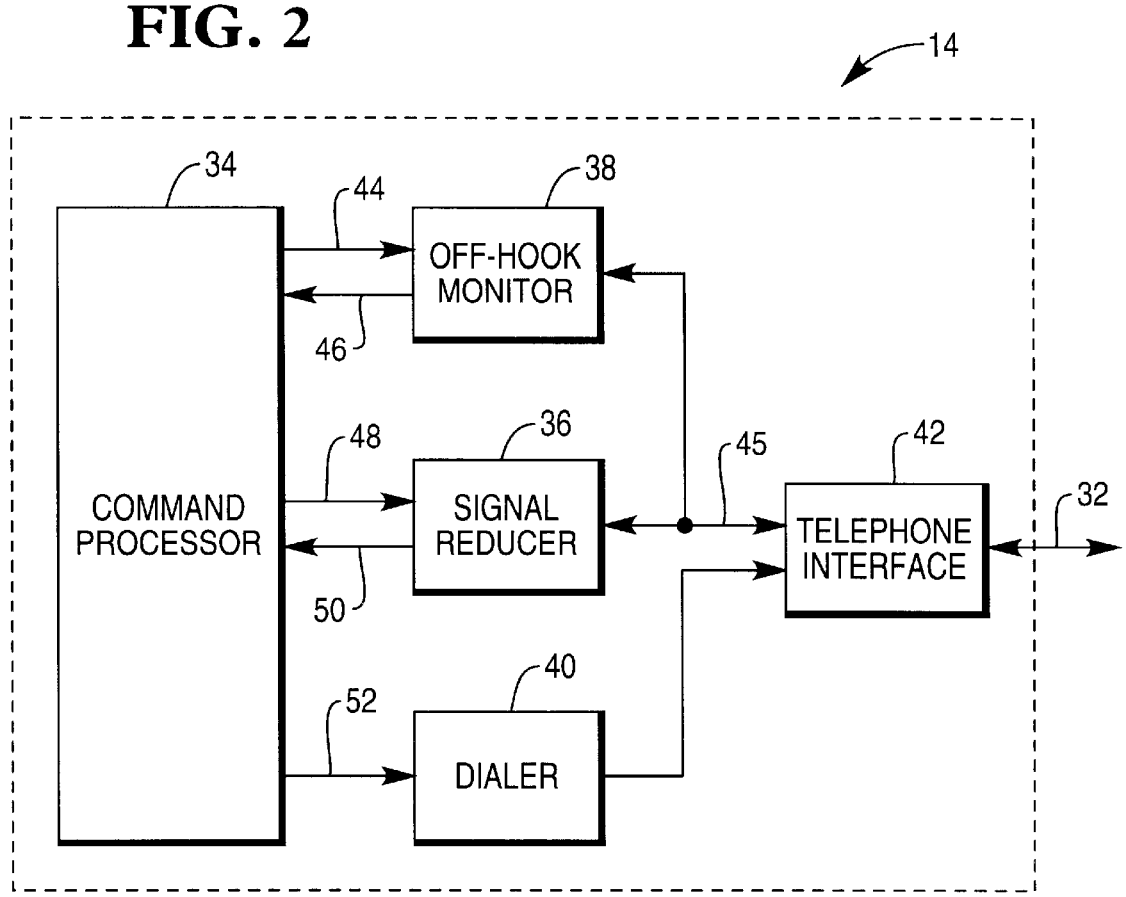
FIG. 2 is a block diagram of the telephony device of FIG. 1.

Referring now to FIG. 2, there is shown a block diagram of the telephony device 14 coupled to the local telephone circuit 10. In the preferred embodiment, the telephony device 14 includes a command processor 34, a signal reducer 36, an off-hook monitor 38, and a dialer 40, each operatively coupled to the local telephone circuit 10 via a telephone interface 42 and the telephone cord 32. The command processor 34, signal reducer 36, off-hook monitor 38, and/or the dialer 40 may be implemented as hardware and/or software within the telephony device 14.

It should be appreciated that as a result of the telephony device 14 requiring most of the computing power of current general purpose computers, a preferred embodiment of the telephony device 14 is implemented with a general purpose computer having telephony software and an add-in card. However, it is anticipated that within a few years it may be cost effective to implement features of the present invention in a special purpose device such as an answering machine.

The command processor 34 generally recognizes and executes both DTMF and voice commands received from any of the telephone sets 12a–12c coupled to the local telephone circuit 10. The command processor 34 also controls the operation of the off-hook monitor 38, the signal reducer 36, and the dialer 40 via control lines 44, 48, and command bus 52, respectively. Furthermore, the command processor 34 receives information from the off-hook monitor 38, and the signal reducer 36 via notification line 46 and dial tone reduced signal line 50, respectively. The command processor 34 is described in more detail below, with reference to FIG. 5.

In most environments, the branch exchange 19 produces a dial tone signal whenever the local telephone circuit 10 is placed in an off-hook state (e.g. a handset 20 is taken off-hook). This dial tone signal may interfere with a voice command received by the telephony device 14 from a telephone set 12a–12c, and this interference may be significant enough to prevent the command processor 34 from accurately recognizing the voice command. Therefore, in a preferred embodiment the signal reducer 36 includes filtering circuitry or alternatively, signal generation circuitry which reduces a dial tone signal on the local telephone circuit 10 and thereby increases the likelihood that the command processor 34 will accurately recognize the voice command.

The off-hook monitor 38 includes known circuitry for monitoring the local telephone circuit 10 for an off-hook state. An off-hook state indicates that one of the telephone sets 12a–12c is in use and that the user may wish to use the call management capabilities of the telephony device 14. When the telephony device 14 is turned on, the off-hook monitor 38 is operatively coupled to the local telephone circuit 10 to monitor the local telephone circuit 10. The off-hook monitor 38 may poll the local telephone circuit 10 to determine the status of the local telephone circuit 10, or alternatively the off-hook monitor 38 may be an interrupt mechanism that is activated by a change of status of the local telephone circuit 10.

The dialer 40 includes conventional circuitry for generating and transmitting signals such as DTMF signals. The dialer 40 is configured to receive a dial command from the command processor 34 and to execute the dial command by generating and transmitting the appropriate signals to the branch exchange 19 via the telephone interface 42 and the local telephone circuit 10.

The telephone interface 42 includes conventional connectors and circuitry for operatively coupling to, sending telephone signals to, and receiving telephone signals from the local telephone circuit 10. It should be appreciated that current modems provide the combined functionality of the dialer 40, and the telephone interface 42. Furthermore, current modems are capable of detecting an off-hook condition. These current modems, however, typically only respond to requests for line status and do not signal an off hook state without a request. As a result, in the preferred general purpose computer embodiment of the present invention, the off-hook monitor 38, the dialer 40, and the telephone interface 42 are implemented with a modified modem that has been configured to signal the general purpose computer when the local telephone circuit 10 is in an off hook state.

Figure 3:
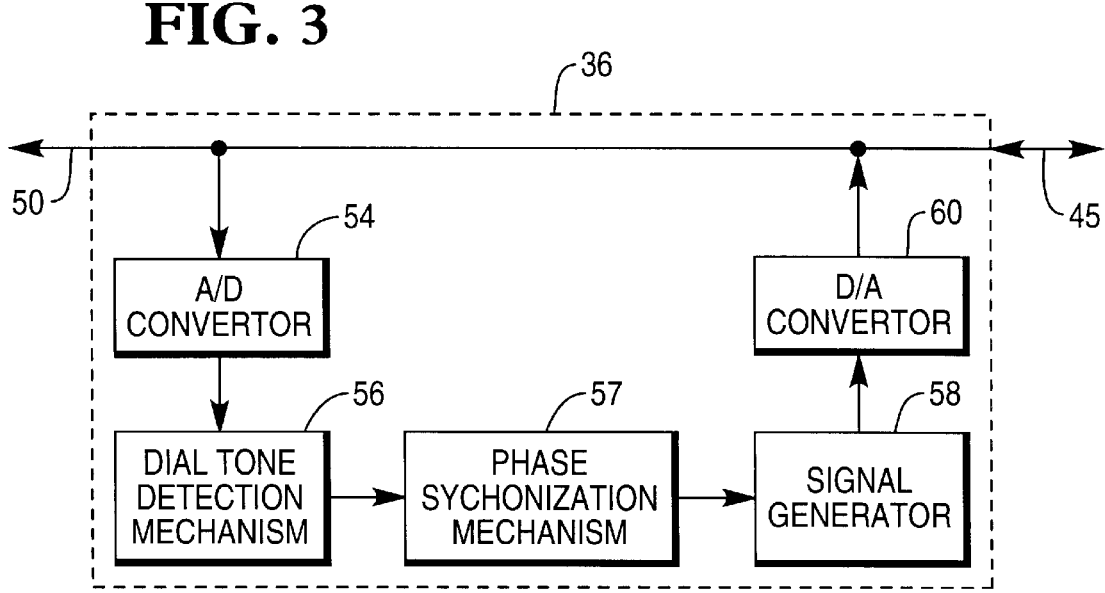
FIG. 3 is a block diagram of an embodiment of the signal reducer of FIG. 2.

Referring now to FIG. 3, there is shown a block diagram of one embodiment of the signal reducer 36. The signal reducer 36 includes an analog to digital (A/D) converter 54, a dial tone detection mechanism 56, a phase synchronization mechanism 57, a signal generator 58, and a digital to analog (D/A) converter 60. The A/D converter 54 and the D/A converter 60 may be implemented with known circuitry to perform the appropriate signal conversions. It should be appreciated, however, that the A/D converter 54 and the D/A converter 60 may not be necessary in all embodiments. For example, the A/D converter 54 and the D/A converter 60 would not be necessary if the local telephone network 10 is already digital (e.g. an ISDN network) or if the dial tone detection mechanism 56, the phase synchronization mechanism 57, and the signal generator 58 were implemented as analog circuitry instead of digital mechanisms.

The dial tone detection mechanism 56, the phase synchronization mechanism 57, and the signal generator 58 may be implemented as analog hardware, digital hardware, or software that configures a processor to perform the appropriate functions. For economic reasons, the preferred embodiment is to implement the dial tone detection mechanism 56, the phase synchronization mechanism 57, and the signal generator 58 as software that configures the main processor of a general purpose computer to perform the appropriate functions. However, for performance reasons it may be preferable to implement these blocks in hardware or as software working in conjunction with a separate digital signal processor.

The dial tone detection mechanism 56, the phase synchronization mechanism 57, and the signal generator 58 may be implemented in various ways that are known to one skilled in the art. Therefore, only the functionality of the dial tone detection mechanism 56, the phase synchronization mechanism 57, and the signal generator 58 are described below.

The A/D converter 54 receives the analog telephone signal including a dial tone signal and a cancellation signal from the telephone signal line 45 and the D/A converter 60. The A/D converter 54 converts this analog telephone signal to a digital telephone signal and transmits this digital telephone signal to the dial tone detection mechanism 56.

The dial tone detection mechanism 56 receives the digital telephone signal from the A/D converter 54, and detects the various frequency components of the dial tone signal of the digital telephone signal. It should be appreciated that detecting the frequency components of the dial tone signal is relatively simple because the dial tone signal has a standardized frequency composition. For example, in the United States the dial tone signal is comprised of a 350 Hz sine wave and a 440 Hz sine wave imposed over each other.

The phase synchronization mechanism 57 receives the detected frequency components of the dial tone signal from the dial tone detection mechanism 56 and identifies the starting point (i.e. the beginning of a cycle) for each frequency component.

The signal generator 58 receives the determined frequency composition of the dial tone signal (i.e. the determined frequency components and starting points). The signal generator 58 from this determined frequency composition generates a digital cancellation signal that has the frequency components of the detected dial tone signal but are 180 degrees out of phase from the dial tone signal. It should be appreciated that the magnitude of the digital cancellation signal controls the volume of the dial tone signal as perceived by a user. For example, the signal generator 58 may increase the magnitude of the digital cancellation signal to reduce the volume of the dial tone and may decrease the magnitude of the digital cancellation signal to increase the volume of the dial tone.

The D/A converter 60 receives the digital cancellation signal and converts the digital cancellation signal to an analog cancellation signal. The D/A converter then injects the analog cancellation signal on dial tone reduced signal line 50 and on the local telephone circuit 10 via the telephone signal line 45 and the telephone interface 42.

It should be appreciated that by injecting this cancellation signal on the dial tone reduced signal line 50 and the local telephone circuit 10 the cancellation signal will cause destructive wave interference with the dial tone signal. This destructive wave interference will in effect partially cancel or reduce the dial tone signal on both the dial tone reduced signal line 50 and the local telephone circuit 10. It should also be appreciated that if the reduction in the dial tone signal on the local telephone circuit 10 is delayed, the reduction may be utilized to provide a user of the call management system 2 an audible cue that the telephony device 14 is ready to receive call management commands.

It should further be appreciated that the phase of the cancellation signal may need to be adjusted to accommodate delay induced by the signal reducer 36 and that the magnitude of the cancellation signal may also need to be adjusted to better reduce the dial tone signal. As can be seen from FIG. 3, a feedback loop from the D/A converter 60 to the A/D converter 54 helps accomplish this adjustment of the cancellation signal.

Figure 4:
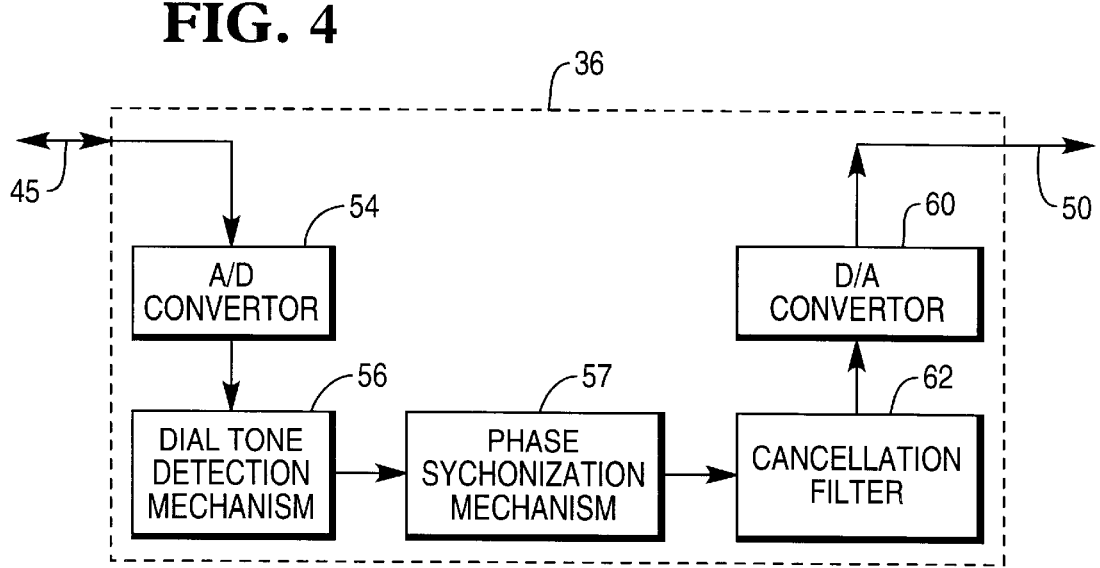
FIG. 4 is a block diagram of another embodiment of the signal reducer of FIG. 2.

An alternative embodiment of the signal reducer 36 is shown in FIG. 4. The signal reducer 36 in this alternative embodiment includes an A/D converter 54, a dial tone detection mechanism 56, a phase synchronization mechanism 57, a cancellation filter 62, and a D/A converter 60. The A/D converter 54, the dial tone detection mechanism 56, the phase synchronization mechanism 57, and the D/A converter 60 may be implemented in the same manner as the above described embodiment of the signal reducer 36. Furthermore, the A/D converter 54, the dial tone detection mechanism 56, and the phase synchronization mechanism 57 function in the same manner as the above described embodiment of the signal reducer 36.

Like the signal generator 58 of the above described embodiment, the cancellation filter 62 may be implemented as analog hardware, digital hardware, or software that configures a processor to perform the appropriate function. For economic reasons, the preferred embodiment is to implement the cancellation filter 62 as software that configures the main processor of a general purpose computer to perform the appropriate functions. However, for performance reasons it may be preferable to implement the cancellation filter 62 in hardware or as software working in conjunction with a separate digital signal processor. Because the D/A converter 60 and cancellation filter 62 may be implemented in various ways that are known to one skilled in the art, only the functionality of the D/A converter 60 and the cancellation filter 62 are described below.

The cancellation filter 62 receives a telephone signal and the determined frequency composition of the dial tone signal (i.e. the determined frequency components and starting points). The cancellation filter 62 filters the determined frequency components of the dial tone signal from the digital telephone signal to produce a digital dial tone reduced telephone signal.

The D/A converter 60 receives the digital dial tone reduced telephone signal, converts the digital dial tone reduced telephone signal to an analog telephone reduced telephone signal, and transmits the digital dial tone reduced telephone signal to the command processor 34. It should be appreciated that if the command processor 34 is implemented to receive digital signals the D/A converter 60 is not necessary.

Figure 5:
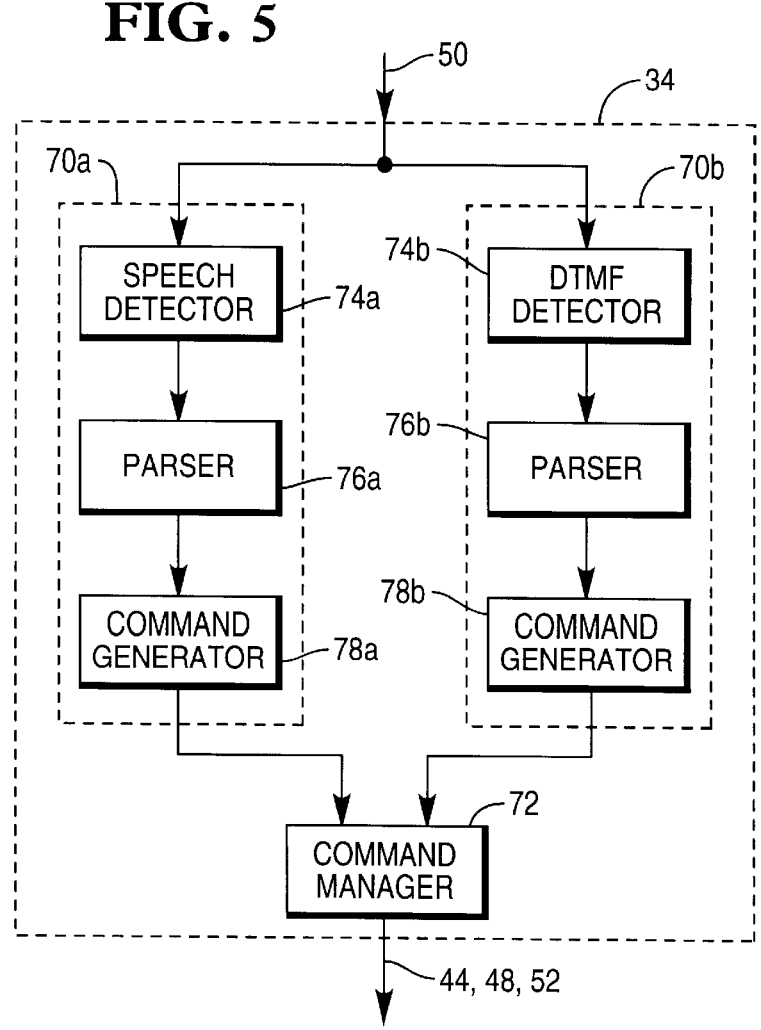
FIG. 5 is a block diagram of the command processor of FIG. 2.

Now referring to FIG. 5, there is shown a block diagram of the command processor 34. The command processor 34 includes a speech processor 70a, a DTMF processor 70b, and a command manager 72. The speech processor 70a includes a speech detector 74a, a parser 76a, and a command generator 78a. Likewise, the DTMF processor 70b includes a DTMF detector 74b, a parser 76b, and a command generator 78b. It should be appreciated that like the various functional blocks discussed in reference to FIG. 3 and FIG. 4, the speech processor 70a, the DTMF processor 70b, and the command manager 74 may be implemented as analog hardware, digital hardware, or software that configures a processor to perform the appropriate functions. For economic reasons, the preferred embodiment is to implement the speech processor 70a, the DTMF processor 70b, and the command manager 74 as software that configures the main processor of a general purpose computer to perform the appropriate functions. However, for performance reasons it may be preferable to implement these functional blocks in hardware or as software working in conjunction with a separate digital signal processor.

Because the speech processor 70a, the DTMF processor 70b, and the command manager 74 may be implemented in various ways that are known to be skilled in the art, only the functionality of these blocks are described below. Furthermore, the functionality of the DTMF processor 70b functions in a manner similar to the speech processor 70a except that the DTMF processor 70b processes DTMF command signals and the speech processor 70a processes voice command signals. Therefore, the DTMF processor 70b is not described in any further detail. The speech detector 74a detects the presence of a voice command signal on the dial tone reduced signal line 50, recognizes phonemes or words or the voice command signal, and converts the recognized phonemes or words into lexical elements.

The parser receives the recognized lexical elements for the requested call management function from the speech detector 74a and parses the received lexical elements against a predetermined grammar. In parsing the received lexical elements, the parser determines whether the requested call management function is in proper form. For example, the grammar may contain an entry for "call"+"name" where "call" is a recognized keyword and "name" is a recognized string like "Bob." Even though the parser may recognize that the requested call management action is in proper form (e.g. "call Bob"), there may be no telephone number associated with Bob.

The command generator 78a works closely with the parser 76a. The command generator 78a takes the lexical elements representing the requested call management action and generates a command or a set of commands that represents the call management action requested by the voice command signal and which the command manager 72 can understand and execute. For example in reference to the above example, when the parser 76a determines that the first lexical element is "call", the command generator 78a may generate a binary code that represents a "call" action to the command manager 72. Next, when the parser 76a determines that the next lexical element is "Bob," the command generator may lookup Bob's telephone number in a table maintained by the telephony device 14, and if a telephone number is in the table, the command generator 78a may generate a binary representation of the telephone number which the command manager 72 can recognize.

The command manager 72 is basically the brains of the telephony device 14. The command manager 72 receives call management commands from the speech processor 70a and the DTMF processor 70b and various other status signals from the other components of the telephony device 14. The command manager 72 then causes control signals to be sent to the various components of the telephony device 14 to effectuate the call management action.

It should be appreciated that various known speech recognition software packages exist that are capable of configuring the processor of a general purpose computer, an add-in card, or a special purpose device to provide the above functionality of the speech processor 70a. Furthermore, it should be appreciated that one or more of the functional blocks of the speech processor may be combined or eliminated depending upon various implementation choices.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. In a site comprising a local telephone circuit coupled to a branch exchange, a method for telephone call management, comprising the steps of:

placing the local telephone circuit of the site in an off-hook state;

receiving with a telephony device of the site that is coupled to the local telephone network a dial tone signal from the branch exchange via the local telephone circuit in response to the placing step;

detecting the off-hook state of the local telephone circuit via the telephony device of the site;

reducing the dial tone signal on the local telephone circuit via the telephony device of the site in response to the detecting step detecting the off-hook state;

receiving with the telephony device via the local telephone circuit, a command signal from a telephone set coupled to the local telephone circuit after the reducing step;

determining with the telephony device of the site, a call management action that corresponds with the command signal; and executing the call management action via the telephony device of the site.

2. The method of claim 1, wherein the step of receiving a command signal includes the step of:

receiving a voice command signal from the telephone set.

3. The method of claim 1, wherein the step of reducing the dial tone signal includes the step of:

injecting a cancellation signal upon the local telephone circuit with the telephone device in order to reduce the dial tone signal on the local telephone circuit.

4. The method of claim 3, wherein the step of reducing the dial tone signal occurs at a period of time after the step of detecting an off-hook state, the period of time being sufficient in length to enable a user to perceive a change in the dial tone signal received via the telephone set.

5. The method of claim 3, wherein the step of reducing the dial tone signal occurs at least one (1) second after detecting the local telephone circuit is in an off-hook state.

6. A telephony device for telephone call management at a site comprising a local telephone circuit coupled to a branch exchange, comprising:

an off-hook monitor, an execution means for executing a call management action, and a signal reducer, each operatively coupled to said local telephone circuit via a telephone interface; and a command processor operatively coupled to said off-hook monitor and said signal reducer;

wherein said off-hook monitor is configured to detect whether said local telephone circuit is in an off-hook state;

wherein said signal reducer is configured to (i) receive via the local telephone circuit a telephone signal having a dial tone signal that is produced by the branch exchange in response to said local telephone circuit being in said off-hook state, and (ii) reduce upon said local telephone circuit, said dial tone signal of said telephone signal in order to produce a dial tone reduced signal in response to receipt of said telephone signal; and wherein said command processor is configured to receive said dial tone reduced telephone signal that includes a command signal from a telephone set coupled to said local telephone circuit, to determine said call management action that corresponds with said command signal; and to send a plurality of control signals to said execution means to effectuate said call management action.

7. The telephony device of claim 6, wherein:

said signal reducer comprises a cancellation signal generator configured to inject into said local telephone circuit a cancellation signal that reduces said dial tone signal upon said local telephone circuit.

8. The telephony device of claim 6, wherein:

said command processor comprises a speech detector, a parser, a command generator, and a command manager;

wherein said speech detector is configured to detect a voice command signal on said dial tone reduced telephone signal and to activate said parser when said voice command is detected;

wherein said parser is configured to receive said voice command signal and to parse said voice command signal into a plurality of lexical elements in a grammar;

wherein said command generator is configured to receive said plurality of lexical elements and to map said plurality of lexical elements into a plurality of manager instructions; and wherein said command manager is configured to receive said plurality of manager instructions and to execute said plurality of manager instructions.

9. The telephony device of claim 6, wherein:

said execution means includes a dialer configured to execute a dial command.

10. A call management system for managing telephone calls at a site comprising a local telephone circuit that is coupled to a branch exchange, comprising:

a first telephone set coupled to said local telephone circuit of said site;

a second telephone set coupled to said local telephone circuit of said site; and a telephony device coupled to said local telephone circuit of said site, said telephony device comprising (i) an off-hook monitor that detects an off-hook state of said local telephone circuit, (ii) a signal reducer which generates and injects a cancellation signal into said local telephone circuit in response to said off-hook monitor detecting said off-hook state, said cancellation signal reducing a dial tone signal upon said local telephone circuit that is generated by said branch exchange in response to said local telephone circuit being in said off-hook state, and (iii) a command processor which recognizes a voice command signal transmitted from an input telephone set when said local telephone circuit is in said off-hook state, said input telephone set selected from said first telephone set and said second telephone set.

11. The call management system of claim 10, wherein said signal reducer includes means for injecting said cancellation signal into said local telephone circuit after a predetermined time period elapses from when said off-hook monitor detects said off-hook state.

12. The call management system of claim 10, wherein said telephony device comprises a general purpose computer and a circuit board coupled thereto, said circuit board comprising said off-hook monitor and said signal reducer.

13. The call management system of claim 10, wherein said command processor includes means for recognizing a dual tone modulated frequency command transmitted from said input telephone set.

14. The call management system of claim 10, wherein said telephony command processor includes means for associating said voice command with a predetermined telephone number, and means for automatically dialing said telephone number on said local telephone circuit.

* * * * *